Oct. 20, 1925.

J. C. HULL 1,558,362

DUST INSECTICIDE APPLYING MACHINE

Filed June 24, 1922

Inventor

John C. Hull

By Brunt Thomas

Attorneys

Oct. 20, 1925.

J. C. HULL 1,558,362

DUST INSECTICIDE APPLYING MACHINE

Filed June 24, 1922  2 Sheets-Sheet 2

Inventor
John C. Hull
By Bacon & Thomas
Attorneys

Patented Oct. 20, 1925.

1,558,362

UNITED STATES PATENT OFFICE.

JOHN C. HULL, OF GASPORT, NEW YORK.

DUST-INSECTICIDE-APPLYING MACHINE.

Application filed June 24, 1922. Serial No. 570,752.

*To all whom it may concern:*

Be it known that I, JOHN C. HULL, citizen of the United States, residing at Gasport, in the county of Niagara and State of New York, have invented certain new and useful Improvements in Dust-Insecticide-Applying Machines, of which the following is a specification.

The invention relates to improvements in a machine for applying insecticides in dust form to trees, plants and the like.

Heretofore in dust machines of this character the fan blowers have been so arranged that a uniform volume of air carrying the insecticide is discharged from the blower. No means have been provided for varying the volume of discharge of the air carrying the insecticidal dust, the result being that frequently when operating the older types of machines excessive waste has resulted because of the constant maximum air and insecticide discharge. With these machines it was very difficult to progressively spray a large tree or the like because of the absence of a control for the air blower.

It is therefore one of the primary objects of this invention to provide a dust machine with adjustable means for varying and controlling the volume of air admitted to the fan blower, to correspondingly control the blast containing the insecticide from the fan blower. This enables the air blast containing the dry insecticide to be accurately regulated whereby a tree may be progressively treated and the air discharge maintained under constant control of the operator of the machine subject to increase or decrease between wide maximum and minimum limits.

The invention also aims to provide a machine of this general character with adjustable means for proportioning and varying the relative quantity of insecticide and air admitted to the fan blower. In carrying out my invention the air and insecticide controlling valves may be connected so as to operate in unison, or said valves may be separably operable.

Another object of this invention is to provide a dust machine for applying insecticide in which the component parts of the machine are all mounted on a common base as a unit structure and are positioned so as to occupy a minimum amount of space.

With these and other objects in view the invention comprises a dust insecticide machine which is exceedingly simple in construction, and one that is inexpensive, yet highly efficient in operation.

In the drawings I have shown the preferred embodiments of my invention, but the invention is susceptible of many changes without departing from the spirit thereof.

In the drawings, Figure 1 represents a side elevation of the dusting apparatus mounted on a truck.

Figure 1:
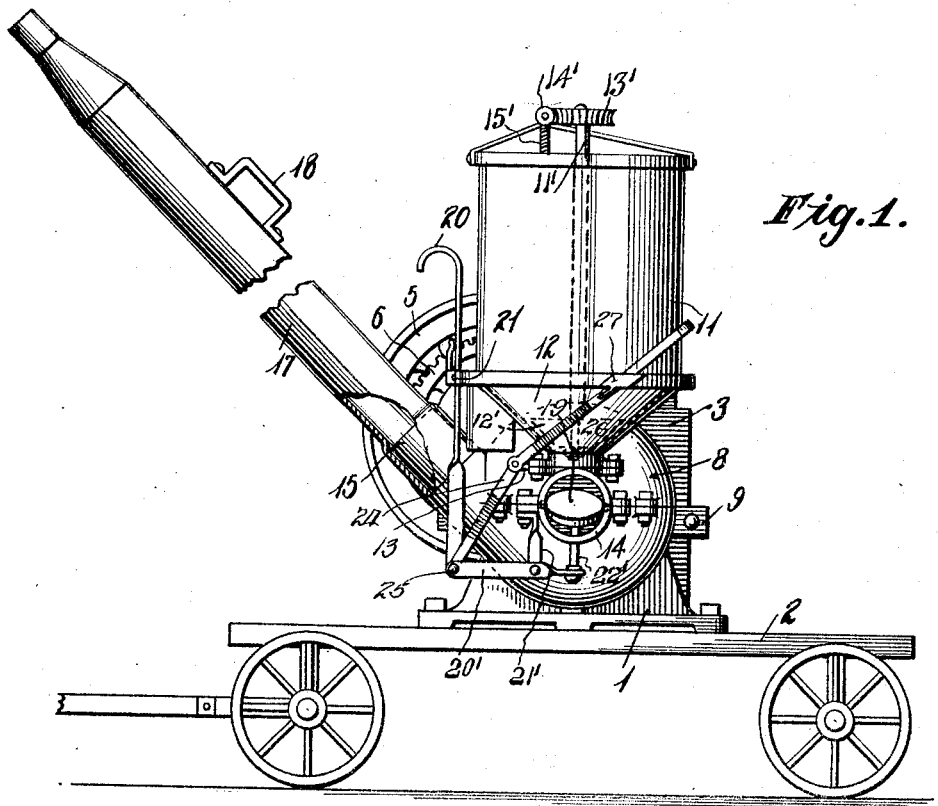
Figure 2:
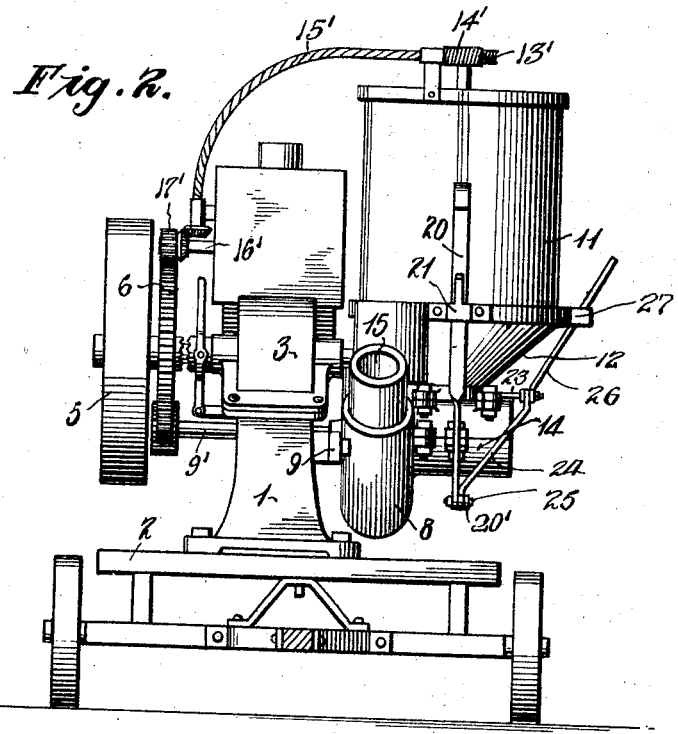
Figure 2 represents a transverse view of the apparatus.
Figure 3:
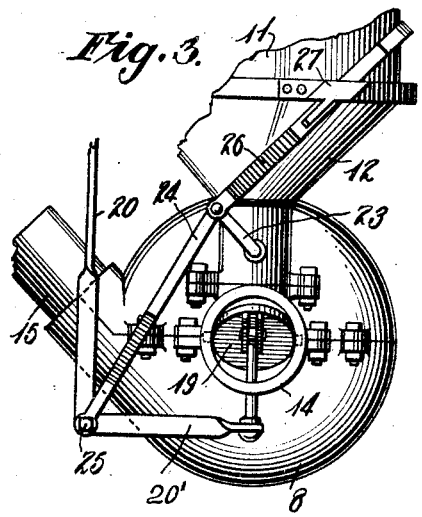
Figure 3 represents a side elevation.
Figure 4:
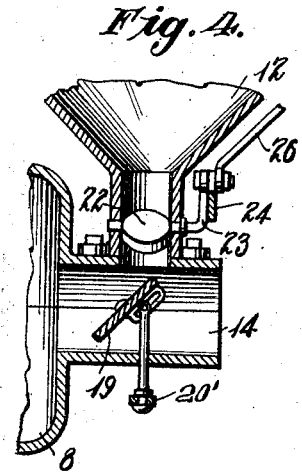
Figure 4 represents a detail sectional view.

Referring now more particularly to the drawings, wherein like reference characters indicate corresponding parts, the numeral 1 designates a base for my dusting machine which is preferably mounted upon a wagon or other travelling support 2. The base 1 is preferably bolted to its support, and said base in turn carries all of the component parts as a unit structure used in the insecticide applying machine. It is to be observed that the invention relates to that type of machine where the dry powdered insecticide is applied with an air current to trees, plants and the like, rather than the spraying type of machine, wherein a liquid solution is employed.

Mounted upon the machine is a horizontal motor 3 preferably of the gasoline type, the crank case thereof and the cylinder of said motor being united to the elongated base 1 by bolts or other detachable means of connection. I have shown a single cylinder type of engine in disclosing this invention, but obviously a multi-cylinder engine may be used. This engine is of the well known explosive type, either air or water cooled, and provided with a carburetor and suitable ignition means, but inasmuch as these features constitute no part of this invention they are not disclosed herein. The crank shaft of the engine drives a fly wheel 5 and mounted on said shaft adjacent the fly wheel is a gear or sprocket 6. A manually operable clutch 15′ is mounted on the crank shaft of the engine and is adapted to be thrown in operating relation with the gear 6 for the purpose of coupling the gear to said shaft and to afford a driving connection between said gear and a gear on the fan shaft 9′.

Connected with the base 1 opposite the fly wheel 5 I provide a fan blower assembly 8, which is united to the base by supporting extensions 9 which are bolted to said base, the fan blower assembly being located along one side of the base. Power is applied to the fan 8 of this assembly by means of its driving shaft 9' which may be operatively connected with the gear 6. The main crank shaft is thus connected to the main fan drive shaft which extends through the main base or frame of the unit. Power is also taken from the main crank shaft and transmitted either by chain or gear to an internal agitator drive shaft 11' carrying a discharging agitator 12' at its lower end and mounted within the dust hopper 12 of the insecticide tank 11, to provide a means whereby the dusting mixture is kept in constant motion to insure a constant and dependable feed to the fan. This agitator 12' is rotated upon the rotation of the shaft 11' by means of the gear 13' thereon meshing with a gear 14' mounted on the flexible shaft 15', which shaft at its opposite end is supported by a bracket 16' and carries a gear 17' meshing with the gear 6.

The fan blower assembly 8 adjacent one side thereof carries and supports an insecticide container 11 having a conical lower portion 12, which container is adapted to receive a supply of any well known insecticide in a dust or powdered form. The insecticide is fed to the fan blower by gravity through a valve controlled passage to be later described.

Heretofore in the use of dust machines, no means have been provided for regulating or varying the air passage to the fan blower, and consequently the air stream issuing from the blower and carrying the insecticide has been a constant one. That is, the air stream issues with sufficient velocity and in sufficient quantity at all times to travel a maximum unchangeable distance. When the insecticide is being applied to certain trees, it is of course desirable to progressively spray the tree and to do this with the older types of machines, where a constant discharge occurs of a uniform volume and travel, much waste has resulted. This invention has as one of its salient features the provision of an adjustable manually controlled means for varying the quantity of air introduced to the blower and to correspondingly vary the volume of air passing through the blower discharge.

In the accompanying drawings the air inlet to the blower is indicated by the reference character 14 and the air and insecticide discharge by the reference character 15, the air insecticide passing through an open ended tube 17 provided with a handle 18. I mount within the air inlet 14 a slidable gate valve or butterfly valve (damper type) 19, which is controlled by the hand lever 20 supported by bearings 21. By raising and lowering this lever the air passage is increased or decreased resulting in a control of the volume of air admitted to the blower, which likewise controls the air discharge containing the insecticide from the blower through the outlet 15. The insecticide may be constantly fed to the fan blower to be picked up and entrained by the air in determined quantities, and it will be appreciated that the operator by manipulating the lever 20 can control the distance of the air blast discharged as well as the volume of air so that a tree may be progressively treated with the insecticide dust. In other words, the lower part of the tree may have the dust applied thereto with a proper volume of discharged air, and the operator may then progressively open the air passage 14 so as to increase the volume of air and enable the insecticide dust to be progressively applied to the other or higher portions of the tree.

As one embodiment of my invention as shown in the drawings I provide in the insecticide discharge tank 11 a valve 22 by which the quantity of insecticide admitted to the travelling air current is controlled. This valve may be operated in unison with the air controlled valve so as to always correctly proportion the relative quantities of air an insecticide dust or the valves may be separably operable. When operatel in unison the valve 22 having the arm 23 is connected to the lever 20 by a link 24 through the agency of the connecting pin 25. By disconnecting the pin 25 and utilizing the extension lever 26, which cooperates with a keeper 27 extended from the tank 11, the valve 22 may be operated independently of the air controlled valve. These alternative operations of the valve are within the control of the user of the machine and under certain conditions it will be desirable to operate the valve in unison, while under other conditions a separate control will be preferable.

In the drawings I have merely attempted to disclose the preferred embodiments of my invention, but I wish it to be understood that the construction and arrangement of the component elements of the entire machine are subject to many changes without departing from this invention. It will be appreciated that the different elements of the machine are, however, united in a unitary structure, and that the assemblies may be freely removed for replacement or repair without necessitating the discarding of other assemblies and parts.

Having thus described my invention, what I claim is:

1. In an insecticide applying machine, the combination with a motor, of a base therefor, a fly wheel disposed at one side of said motor and driven thereby, a fan blower supported by said base at the opposite side of the motor, means for driving the fan in said blower from said engine, including a shiftable clutch, and a transverse driving shaft, an air inlet to said blower, an insecticide containing tank supported by said fan blower and having a discharge entering said air inlet, an adjustable valve regulating the volume of air admitted to the blower, an adjustable valve for admitting regulated quantities of insecticidal powder to said blower, and mechanism for connecting said valves whereby they operate in unison to proportion the quantity of air and insecticidal powder in definite ratios admitted to the blower.

2. An insecticide applying machine, comprising a blower, a motor for driving the same, an air inlet to the blower, an adjustable means for controlling the volume of air admitted thereto, means for admitting powdered insecticide to the blower, a valve for proportioning the quantity of insecticide admitted to the blower, means for simultaneously operating said air and insecticide controlling valves, and a discharge for the blower through which the air carrying the insecticide travels.

3. In an insecticide applying machine, the combination with a blower having a fan therein, a motor for driving said fan, an air inlet to said blower, adjustable means for regulating the quantity of air admitted to the blower, a valve for admitting the insecticide to said blower in a determined ratio to the quantity of air, means connecting said valves whereby they operate in unison, and a discharge for said blower.

4. In an insecticide applying machine, the combination with a motor, a base therefor, a blower supported by said base at one side of the motor, an insecticide receiving tank mounted on said blower, said blower having an air inlet, an adjustable valve controlling said inlet, an adjustable valve controlling the passage of insecticide from said tank to said blower to proportion the quantity of insecticide admitted thereto, and means connecting said valves whereby they operate in unison to maintain the insecticide and the air in determined ratios.

JOHN C. HULL.